United States Patent [19]

Wagner

[11] Patent Number: 4,755,724

[45] Date of Patent: Jul. 5, 1988

[54] METHOD FOR PERIODIC TRIGGERING OF SEVERAL RADIATION-EMITTING ELEMENTS

[75] Inventor: Elmar Wagner, Heilbronn, Fed. Rep. of Germany

[73] Assignee: Telefunken Electronic GmbH, Heilbronn, Fed. Rep. of Germany

[21] Appl. No.: 895,926

[22] Filed: Aug. 13, 1986

[30] Foreign Application Priority Data

Aug. 17, 1985 [DE] Fed. Rep. of Germany ....... 3529571

[51] Int. Cl.4 ....................... H05B 39/09; G03B 27/72

[52] U.S. Cl. .................................... 315/307; 315/297; 315/169.2; 315/169.3; 315/160; 315/291; 355/41; 355/69; 340/752; 340/753; 340/782; 340/805

[58] Field of Search ....................... 315/307, 297, 8.51, 315/169.2, 169.3; 355/41, 69; 340/752, 753, 805, 782

[56] References Cited

U.S. PATENT DOCUMENTS

| | | | |
|---|---|---|---|
| 3,701,123 | 10/1972 | Barrett et al. | 315/169.3 |
| 3,959,791 | 5/1976 | Takahashi et al. | 340/782 |
| 4,113,391 | 9/1978 | Minowa | 400/120 |
| 4,155,084 | 5/1979 | Klees | 340/782 |
| 4,170,745 | 10/1979 | Rich et al. | 315/307 |
| 4,359,670 | 11/1982 | Hosaka et al. | 315/307 |
| 4,527,093 | 7/1985 | Yamauchi et al. | 315/307 |
| 4,527,156 | 7/1985 | Nawrocki et al. | 340/782 |

FOREIGN PATENT DOCUMENTS

| | | |
|---|---|---|
| 3141953 | 6/1982 | Fed. Rep. of Germany . |
| 3230226 | 3/1983 | Fed. Rep. of Germany . |
| 3307381 | 9/1983 | Fed. Rep. of Germany . |
| 3321923 | 1/1984 | Fed. Rep. of Germany . |
| 3422907 | 1/1985 | Fed. Rep. of Germany . |
| 3329311 | 2/1985 | Fed. Rep. of Germany . |
| 0152080 | 11/1980 | Japan . |
| 0126182 | 10/1981 | Japan . |

OTHER PUBLICATIONS

"LED Display Dimmer," *ELEKTOR*, Mar. 1983, vol. 3, pp. 42–45.

Frisch et al., "Lumineszenzdioden im getakteten Betrieb," ELEKTRONIK, vol. 23, Nov. 19, 1982, pp. 55–59.

Dyer et al., "Printing Energy Control for a Thermal Printer," *IBM Tech. Disc.*, vol. 24, No. 7B, Dec. 1981, p. 3973.

Heiling et al., "Thermal Print Head Power Supply Regulator," *IBM Tech. Disc.*, vol. 22, No. 5, Oct. 1979, p. 2023.

Matthews, "Low Power, High Quality, High Speed Piezoelectric/Thermal Printhead," *IBM Tech. Disc.*, vol. 21, No. 8, Jan. 1979, pp. 3062–3064.

Helinski et al., "Printer Pulse Width Control," *IBM Tech. Disc.*, vol. 22, No. 3, Aug. 1979, pp. 966–967.

*Primary Examiner*—David K. Moore
*Assistant Examiner*—Michael J. Nickerson
*Attorney, Agent, or Firm*—Spencer & Frank

[57] ABSTRACT

The invention relates to a method of controlling several radiation-emitting elements. The invention consists in the compensation of differences in the emission power of the individual elements due to variations in the efficiency of the elements or to differing operating conditions by operating each radiation-emitting element with an individual pulse length determining the overall emission time. In this way, the energy emitted by all elements triggered is substantially identical.

9 Claims, 2 Drawing Sheets

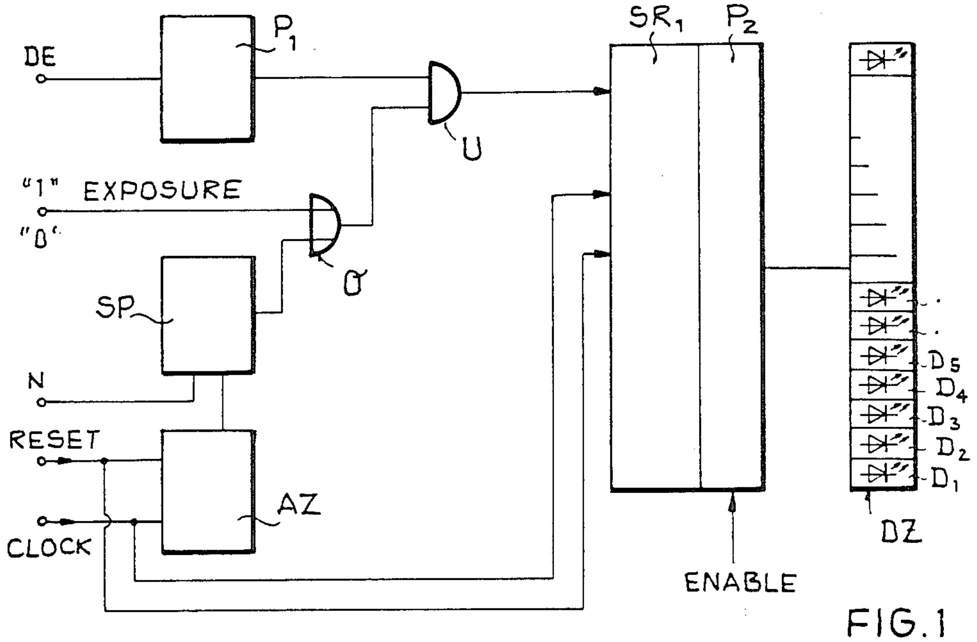
FIG. 1
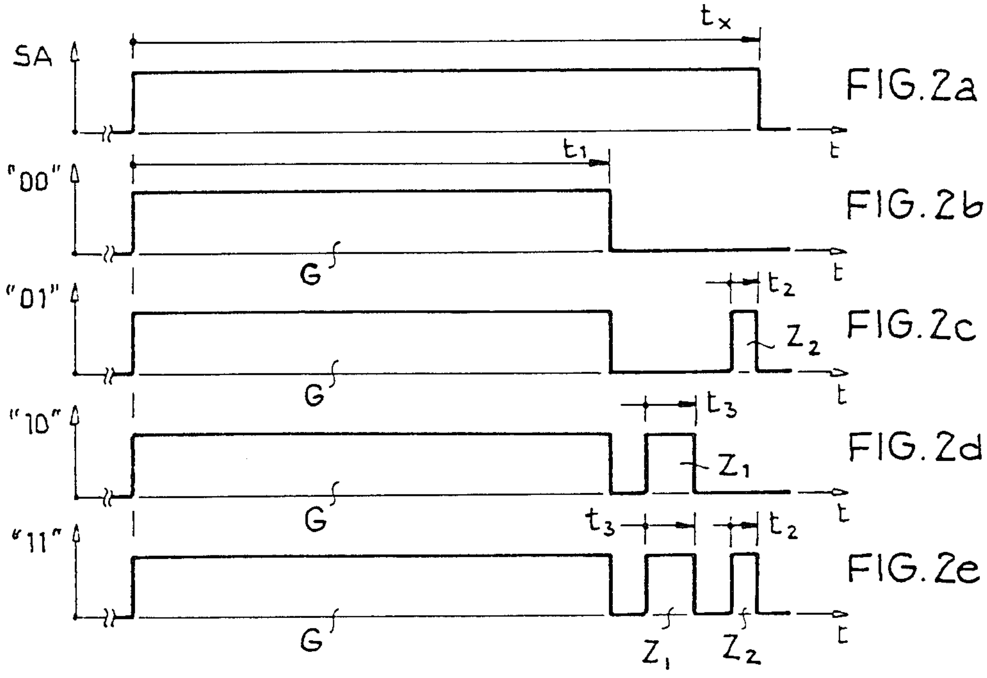
FIG. 2a
FIG. 2b
FIG. 2c
FIG. 2d
FIG. 2e

| | $D_1$ | $D_2$ | $D_3$ | $D_4$ | $D_5$ |
|---|---|---|---|---|---|
| DE | 1 | 0 | 1 | 1 | 0 |
| SP | 010 | 011 | 111 | 110 | 110 |
| SR 1. LOAD | 1 | 0 | 1 | 1 | 0 |
| SR 2. LOAD | 0 | 0 | 1 | 1 | 0 |
| SR 3. LOAD | 0 | 0 | 1 | 0 | 0 |

FIG. 3

METHOD FOR PERIODIC TRIGGERING OF SEVERAL RADIATION-EMITTING ELEMENTS

BACKGROUND OF THE INVENTION

Methods for periodic triggering of several beam-emitting elements are gaining greater and greater importance, for example in information technology. For example, arrays of luminescent diodes are used to expose photoconductive drums in printing equipment, said arrays being controlled by integrated circuits according to the image pattern to be represented. For example, TELEFUNKEN electronic GmbH has developed an LED module designated TPHM 8080 whose width equals the A4 format and which comprises a line of 2560 gallium-arsenide-phosphide luminescent diodes and 20 integrated circuits for driving the LEDs.

The image, resolved into a bit pattern, and which is to be reproduced by the LED line, is input into shift register ICs via an 8-bit parallel data flow. A pulse triggers the transfer of the bit pattern from the shift register to a data buffer memory. The various luminescent diodes are switched on by a further activation signal in accordance with the stored bit pattern.

In conventional control circuits, there is the limitation that a triggering pulse with the same amplitude and duration is provided for all individual diodes, so that the tolerance in the efficiencies between the individual elements had to be as narrow as possible for the emitted energy of all elements triggered to be substantially the same. This difficult requirement for efficiency scattering meant that the yield of suitable luminescent diodes for arrangement in rows was relatively low, with optimum uniformity of the energy emitted also not being obtainable due to unavoidable differences in the operating conditions for the individual components.

SUMMARY OF THE INVENTION

The objective underlying the invention is therefore to provide a method for periodic triggering of several radiation-emitting elements with the effect that the energy emitted by all elements triggered is substantially identical, without paying for this in yield losses when manufacturing the components. This objective is achieved in accordance with the invention by compensating for differences in the emission power of the individual elements due to efficiency differences in the elements or differing operating conditions by operating each radiation-emitting element with an individual pulse length, with the result that the energy emitted by all elements triggered is substantially identical.

With the method according to the invention, an advantageous embodiment enables the overall emission time for each element to be quantized in individual steps. The commands for the individual steps are filed and defined separately for each element in a memory. The contents of the memory are, for example, determined after completion of a diode array by measuring the efficiencies of the individual elements. The quantization of the overall emission time will advantageously be restricted to that part of the overall emission time which is necessary for compensation of the maximum scattering of the emission efficiencies of the individual elements. That means that all individual elements triggered are subjected to a basic emission time which for less efficient elements is supplemented by additional emission times.

The invention and its advantageous embodiments will be explained below using an example.

BRIEF DESCRIPTION OF THE DRAWINGS

FIG. 1 shows a suitable circuit arrangement for conducting the method in accordance with the invention.

FIGS. *a–e* 2, show the possible individual steps for triggering the luminescent diodes.

FIG. 3 shows a data matrix in the shift register for triggering the diode line for one section of 5 diodes in a row.

DESCRIPTION OF THE PREFERRED EMBODIMENTS

According to FIG. 1, information is input at data input DE from a computer into the buffer memory P1, for example, with the information corresponding to the image pattern to be reproduced by the diode line DZ. This digital information is loaded via the AND gate U into the shift register SR.

In FIG. 3 there is assumed that for a section of a 5-diode-array D1–D5, the bit pattern 10110 is input into the shift register via data input DE. This means that diodes D1, D3 and D4 are to come on during a defined time interval, while diodes D2 and D5 remain off. The time interval during which this exposure pattern is emitted is designated $t_x$ in FIG. *2a.*

Within the diode array DZ there are individual elements with a scatter in efficiency and operating under differing conditions. Thus, for example, individual diodes have already emitted the required energy after a time $t_1$ according to FIG. *2b,* while other elements, according to FIGS. *2c, 2d* and *2e* only achieve the required energy emission by being triggered in additional time intervals $t_2$ or $t_3$.

In the embodiment according to FIG. 2, the maximum overall emission time for each element was divided into three steps, comprising the basic emission time G during the time $t_1$, and the additional emission times $Z_1$, $Z_2$ during the times $t_2$, $t_3$. It is, of course, possible to quantize the overall emission time in as many individual steps as required to meet the requirements, although memory capacity and exposure time period increase the more individual steps there are.

The embodiment illustrated with three individual steps has proved its value and has led to an increase in the precision of the power emitted between the individual components by a factor of 3. The basic emission time G in this emobidment was 850 μs, while the additional emission times $Z_1$, and $Z_2$ were 200 and 100 μs respectively. The amplitude of driving SA was identical for all emission phases.

After completion of a diode array, it is determined for all individual elements which individual steps are necessary to trigger the individual element to ensure a uniform energy emission for the elements. With four different overall emission times possible, as shown in FIGS. *2b–2e,* 2 bits are required for storing the necessary information in the memory SP. The data "00" correspond then, for example, to basic exposure G, "01" to basic exposure G plus additional exposure $Z_2$ during time $t_2$, "10" to basic exposure G and additional exposure $Z_1$ during time $t_3$, while "11" is allocated to a diode for which all three exposure steps G, $Z_1$ and $Z_2$ are necessary. This information is filed in memory SP according to FIG. 1.

In the embodiment shown in FIG. 1, the second input of the AND gate U is connected with the output of an OR gate O, whose one input is the content of memory SP while the signal at the other input provides the information, whether the following exposure will be the basic exposure or one of the additional exposures. The memory SP is fed with an instruction at input N which determines whether the first or second additional exposure $Z_1$ or $Z_2$ is called, while the addressing counter AZ calls the memory locations one after the other in memory SP. The address counter is triggered by a clock pulse input and a reset input.

The shift register SR is loaded in the usual way from the AND gate output under control of the clock signal. A strobe pulse at the reset input of the addressing counter triggers the transfer of the bit pattern from the shift register to a data buffer memory P2. The luminescent diodes in line DZ are switched on by a further activation signal at the "enable" input of the buffer memory P2 in accordance with the bit pattern stored in the shift register. In a method according to the invention, the shift register SR is loaded and read three times during a time interval $t_x$ for one exposure operation, to determine in this way the individual overall emission power of every single element. In accordance with FIG. 3, it is assumed that the additional exposure information is filed in the way shown in memory SP. According to the example of FIG. 3, additional exposure is not necessary for diode $D_1$, for diode $D_2$ additional exposure $Z_2$, for diode $D_3$ additional exposures $Z_1$ and $Z_2$, and for diodes $D_4$ and $D_5$ additional exposure $Z_1$.

For basic exposure G, a logic "1" is applied at the exposure input of the OR gate, which in consequence is also passed to one input of the AND gate U. The information at data input DE is therefore written directly into shift register SR during the first loading operation. In the embodiment according to FIG. 3, this is the data sequence "10110", so that the diodes $D_1$, $D_3$ and $D_4$ emit the basic exposure. In the next loading operation of the shift register, the AND gate U forms a logical AND of the first bit in the memory SP and the respective original information from the buffer $P_A$. In the example illustrted, this results in the shift register contents "00110", so that diodes $D_3$ and $D_4$ emit the additional exposure $Z_2$. In the third loading operation of the shift register, the second bit of memory SP is used, so that in the selected embodiment the shift register contents are "00100", with the result that only diode $D_3$ emits the further additional exposure $Z_1$.

The shift register SR is reloaded in the times between the various exposure phases, and, upon completion of all three exposure phases, a new bit pattern is loaded via data input DE. The memory SP preferably is an EPROM. The method according to the invention and the appropriate circuit arrangement is preferably used for triggering linear-arranged LEDs, as supplied, for example, by TELEFUNKEN electronic under the designation TPHS 4300 or TPHS 4400. These diode arrays are particularly suited for exposure of photoconductive layers or other light-sensitive materials for printing applications.

What is claimed is:

1. A method for the periodic triggering of a plurality of radiation-emitting elements wherein differences in the emission power of the individual elements (D) due to variations in the efficiency of the elements or due to different operating conditions are compensated for by operating each radiation-emitting element with an individual pulse length determining the overall emission time so that the energy emitted by all triggered elements is substantially equal; said method comprising: quantizing the overall emission time for each element in individual digital additive steps with the quantization being restricted to that part of the overall emission time which is necessary for the compensation of the maximum difference in the emission power of the elements to provide a first partial pulse corresponding to a basic emission time for all elements to be triggered, and further partial pulses as individual additional emission times for certain of the elements to be triggered to compensate for the differences in the emission power; storing at least the further partial pulses in a defined fashion for each element separately in a memory (sp); and triggering the respective said elements by means of said first partial pulse and any associated respective of said further pulses stored in the memory.

2. A method according to claim 1, characterized in that it is used to trigger light-emitting diodes (D) arranged in a line (DZ).

3. A method according to claim 1, characterized in that it is used to expose photoconductive layers or other light-sensitive materials.

4. A circuit arrangement for performing the method according to claim 1, wherein a logic circuit (U, O) is provided, with which the data input signals for the elements are linked to the partial pulse signals called from a memory (SP) and wherein the instructions for the individual emission phases are input into a shift register (SR), to be reloaded between each phase, said register driving the individual elements and thus determining the emission pattern.

5. A circuit arrangement according to claim 4, wherein the first partial pulse provided for all elements and determining the basic emission time is directly linked to the data input signals, while the instructions for the individual partial pulses determining the additional emission times required are called from a clock pulse-controlled address counter and are linked with the original data input signals.

6. A method according to claim 1 wherein said further partial pulses comprise pulses of different lengths which are shorter in duration of said first partial pulse.

7. A method for the periodic triggering of a plurality of radiation emitting elements, wherein differences in the emission power of the individual elements (D) due to variations in the efficiency of the elements or to differing operating conditions are compensated for by operating each radiation emitting element with an individual pulse length determining the overall emission time so that the energy emitted for all triggered elements is equal; said method comprising: providing a first partial pulse corresponding to a basic emission time for all elements to be triggered; quantizing that part of the overall emission time of each element which is necessary to compensate for the maximum difference encountered in the emission power of the elements (D) with respect to said basic emission time to provide further partial pulses, with different pulse lengths, as individual additional emission times of certain of the elements to be triggered to compensate for the differences in the emission power; storing at least said further partial pulses in a memory; and triggering said elements within said overall emission time by said first partial pulse and any associated respective of said further pulses stored in the memory.

8. A method according to claim 7 wherein said elements to be triggered are light-emitting diodes arranged in a linear array.

9. A method according to claim 7 wherein said step of triggering includes; providing a data input signal corresponding to the individual ones of said elements to be energized; generating said first partial pulse for each of said elements to be energized in response to said data input signal; and combining the respective generated said first partial pulses with any of said further partial pulses stored in the memory for the associated ones of said elements.

* * * * *